United States Patent
Chen et al.

(10) Patent No.: US 12,510,946 B2
(45) Date of Patent: Dec. 30, 2025

(54) CONTROL METHOD

(71) Applicant: Lenovo (Beijing) Limited, Beijing (CN)

(72) Inventors: Ziguo Chen, Beijing (CN); Xida Lu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 63 days.

(21) Appl. No.: 18/411,676

(22) Filed: Jan. 12, 2024

(65) Prior Publication Data

US 2024/0241557 A1 Jul. 18, 2024

(30) Foreign Application Priority Data

Jan. 16, 2023 (CN) .......................... 202310084169.9

(51) Int. Cl.
*G06F 1/28* (2006.01)

(52) U.S. Cl.
CPC ..................................... *G06F 1/28* (2013.01)

(58) Field of Classification Search
CPC ........................................................ G06F 1/28
See application file for complete search history.

(56) References Cited

U.S. PATENT DOCUMENTS

| | | | |
|---|---|---|---|
| 8,677,157 B1* | 3/2014 | Sevtsenko | G06F 11/3457 713/300 |
| 9,250,684 B1* | 2/2016 | Chen | G06F 1/3206 |
| 9,415,584 B2* | 8/2016 | Shibata | B41J 2/04586 |
| 10,817,039 B2* | 10/2020 | Nguyen | G06F 1/329 |
| 2009/0259345 A1* | 10/2009 | Kato | G06F 1/20 718/1 |
| 2013/0124885 A1* | 5/2013 | Davis | G06F 1/325 713/320 |
| 2013/0318371 A1* | 11/2013 | Hormuth | G06F 11/3062 713/320 |
| 2014/0101475 A1* | 4/2014 | Berke | G06F 1/3287 713/340 |
| 2017/0040895 A1* | 2/2017 | May | G01R 19/165 |
| 2019/0041937 A1* | 2/2019 | Li | G06F 1/28 |
| 2020/0012334 A1* | 1/2020 | Bodireddy | G06F 1/3234 |
| 2020/0073456 A1* | 3/2020 | Nguyen | G06F 1/3296 |
| 2022/0091649 A1* | 3/2022 | Knoth | G06F 1/28 |
| 2023/0205295 A1* | 6/2023 | Brooks | G06F 1/3206 713/300 |

* cited by examiner

*Primary Examiner* — Aurel Prifti
(74) *Attorney, Agent, or Firm* — ANOVA LAW GROUP, PLLC

(57) ABSTRACT

A control method includes: obtaining operating power consumption information of a processor at a current detection time point; determining a target power consumption threshold within a preset adjustment range based on the operating power consumption information; and adjusting a power consumption threshold of the processor from an original power consumption threshold to the target power consumption threshold to cause the processor to operate based on the target power consumption threshold at least before a first detection time point.

20 Claims, 8 Drawing Sheets

CONTROL METHOD

CROSS-REFERENCES TO RELATED APPLICATION

This application claims priority to Chinese Patent Application No. 202310084169.9 filed on Jan. 16, 2023, the entire content of which is incorporated herein by reference.

FIELD OF TECHNOLOGY

The present disclosure relates to a control method.

BACKGROUND

The conventional dynamic power allocation scheme presets different power consumption intervals and sets fixed power consumption usage in different scenarios. For example, when an electronic device runs a game, the electronic device will enter a certain power consumption threshold. When operating within the power consumption threshold, the power consumption value of each processor is a set power consumption value. Since the setting of the power consumption threshold is based on a whitelist obtained from a large amount of preliminary test data in different scenarios, for some scenarios without test data, power cannot be dynamically allocated. As a result, the power consumption value set in the electronic device cannot match the needs of each processor.

SUMMARY

One aspect of this disclosure provides a control method. The control method includes obtaining operating power consumption information of a processor at a current detection time point, determining a target power consumption threshold within a preset adjustment range based on the operating power consumption information, and adjusting a power consumption threshold of the processor from an original power consumption threshold to the target power consumption threshold to cause the processor to operate based on the target power consumption threshold at least before a first detection time point. The original power consumption threshold is the power consumption threshold used by the processor from a second detection time point to the current detection time point. The first detection time point is later than the current detection time point and adjacent to the current detection time point. The second detection time point is earlier than the current detection time point and adjacent to the current detection time point. The power consumption threshold is an upper limit of the power consumption for the processor during operation.

Another aspect of this disclosure provides a computer readable storage medium containing computer-executable instructions, when executed by one or more processors, the computer-executable instructions performing the control method described above and in the following descriptions.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Figure 1:
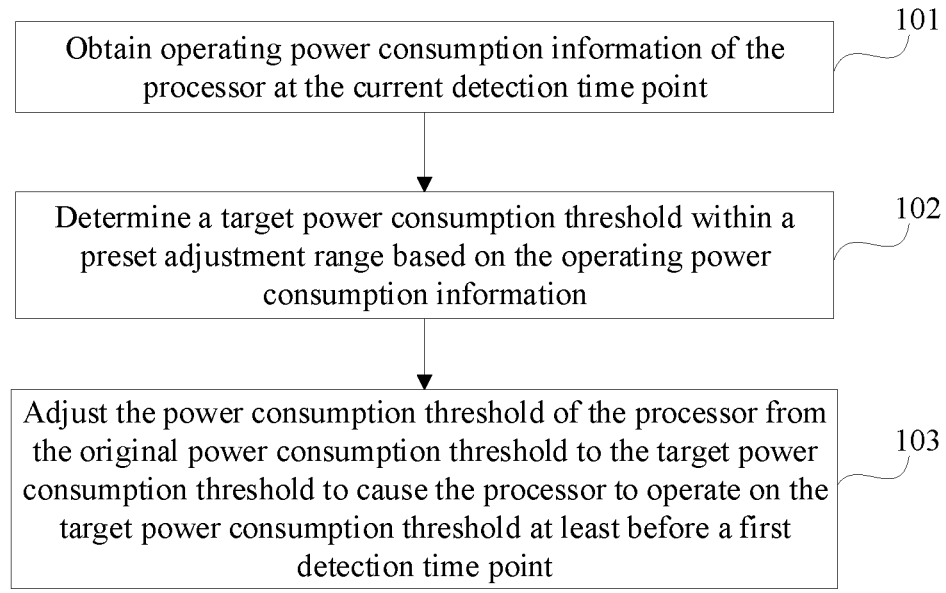
FIG. 1 is a flowchart of a control method according to an embodiment of the present disclosure.

FIG. 1 is a flowchart of a control method according to an embodiment of the present disclosure. The method can be applied to an electronic device, which may include one or more processors. The method will be described in detail below.

101, obtaining operating power consumption information of the processor at the current detection time point.

A plurality of detection time points may be set in the electronic device, and the time intervals between the plurality of detection time points may be the same or different.

In some embodiments, when a certain detection time point is reached, the operating power consumption information of the processor may be obtained.

More specifically, during the operation of the processor, the operating power consumption information may be transmitted to the system of the electronic device. Correspondingly, the operating power consumption information may be obtained from the system of the electronic device.

In some embodiments, the operating power consumption information may be a power consumption value or a power consumption ratio, etc.

In some embodiments, the power consumption ratio may be the ratio of the power consumption of the processor to the overall power consumption of the electronic device.

In some embodiments, if there are plurality of processors in the electronic device, the obtained power consumption ratio of a certain processor may be the ratio of the power consumption of the processor to the overall power consumption of the plurality of processors.

102, determining a target power consumption threshold within a preset adjustment range based on the operating power consumption information.

In some embodiments, the adjustment range of the processor may be set in the electronic device in advance. The upper and lower limits of the adjustment range respectively represent the maximum power consumption threshold and the minimum power consumption threshold that the processor can reach.

In some embodiments, the power consumption may represent the operating power consumption of the processor at the current detection time point.

Based on the power consumption, the power consumption required for the operation of the processor can be determined. Therefore, based on the operating power consumption information, the power consumption required by the processor in the subsequent time can be estimated. Correspondingly, the target power consumption threshold can be determined based on the estimated required power consumption.

In some embodiments, based on the operating power consumption information, if it is estimated that the processor will require more power in the subsequent time, a higher target power consumption threshold can be determined. Alternatively, based on the operating power consumption information, if it is estimated that the processor will require less power in the subsequent time, a lower target power consumption threshold can be determined.

It should be noted that based on the operating power consumption information, if it is estimated that the power consumption required for the subsequent events of the processor will be consistent with the current power consumption, there is no need to determine the target power consumption threshold and the current power consumption threshold can continue to be used.

103, adjusting the power consumption threshold of the processor from the original power consumption threshold to the target power consumption threshold to cause the processor to operate on the target power consumption threshold at least before a first detection time point.

In some embodiments, the first detection time point may be later than the current detection time point and adjacent to the current detection time point.

In some embodiments, the power consumption threshold may be the upper limit of power consumption that can be used by the processor during operation.

In some embodiments, the original power consumption threshold may be the power consumption threshold used by the processor from a second detection time point to the current detection time point.

In some embodiments, the second detection time point may be earlier than the current detection time point and adjacent to the current detection time point.

In some embodiments, the target power consumption threshold may be different from the original power consumption threshold.

In some embodiments, after the target power consumption threshold is determined at the current detection time point, the power consumption threshold of the processor may be adjusted from the original power consumption threshold to the target power consumption threshold.

In some embodiments, the original power consumption threshold may be the power consumption threshold used from the previous detection time point (e.g., the second detection time point) to the current detection time point.

More specifically, the original power consumption threshold may be the target power consumption threshold determined at the second detection time point, or may be the target power consumption threshold determined at the detection time point before the second detection time point.

In some embodiments, in the time period from the second detection time point to the current detection time point, the power consumption threshold of the processor may be used as the original power consumption threshold. After the target power consumption threshold is determined at the current detection time point, the original power consumption threshold may be replaced with the target power consumption threshold. In this way, between the current detection time point and the first detection time point, the target power consumption threshold can be used as the power consumption of the processor.

It should be noted that the power consumption threshold corresponds to the situation where the power supply in the electronic device can allocate power to the processor. Based on the operating power consumption information of the processor, the power consumption required by the processor can be estimated and the target power consumption threshold can be determined. The power supply of the electronic device can be dynamically allocated to the processor based on the target power consumption threshold to match the needs of the processor.

Consistent with the present disclosure, the operating power consumption information of the processor at the current detection time point can be detected. Based on the operating power consumption information, the target power consumption threshold can be determined within a preset range, and the power consumption threshold of the processor can be adjusted from the original power consumption threshold to the target power consumption threshold. The original power consumption threshold may be the power consumption threshold used in the time period between the current detection time point and the second detection time point before and adjacent to the current detection time point. In the subsequent time, from the current detection time point to at least the subsequent first detection time point, the target power consumption threshold can be used. The operating power consumption information can be used to estimate the operating power consumption of the processor in the subsequent time and determine the target power consumption threshold. During subsequent operations, the operating power consumption of the processor can match the target power consumption threshold. Since the electronic device can dynamically allocate power to the processor based on the target power consumption threshold, the power supply can provide sufficient power to the processor, thereby optimizing the power allocation of the processor in the electronic device.

Figure 2:
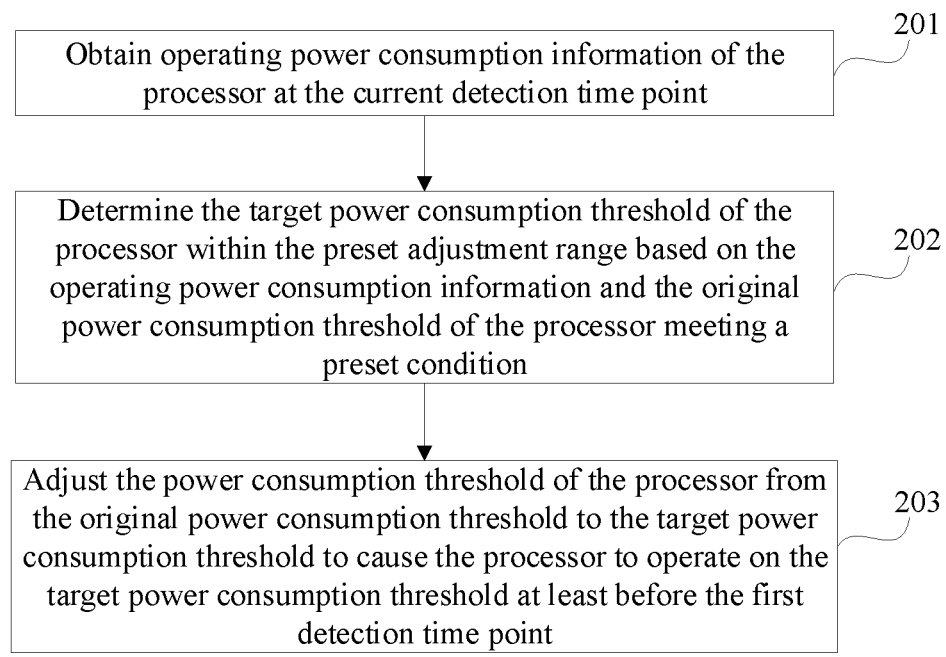
FIG. 2 is a flowchart of the control method according to an embodiment of the present disclosure.

FIG. 2 is a flowchart of the control method according to an embodiment of the present disclosure. The method will be described in detail below.

201, obtaining operating power consumption information of the processor at the current detection time point.

The process at 201 is consistent with the process at 101, and will not be described again here.

202, determining the target power consumption threshold of the processor within the preset adjustment range based on the operating power consumption information and the original power consumption threshold of the processor meeting a preset condition.

In some embodiments, the operating power consumption information and the target power consumption threshold may not meet the preset condition.

In some embodiments, the power supply of the electronic device may allocate power to the processor based on the processor's power consumption threshold.

To ensure that the power provided by the power supply to the processor matches the operating power consumption information of the processor during operation, the power consumption threshold of the processor needs to be adjusted based on the operating power consumption information of the processor.

In some embodiments, if the operating power consumption information and the original power consumption threshold of the processor do not meet the preset condition, there is no need to determine the target power consumption threshold. Correspondingly, there is no need to adjust the processor's power consumption threshold.

In some embodiments, the target power consumption threshold of the processor may be related to the operating power consumption information of the processor. The target power consumption threshold may be determined based on a fixed value and the operating power consumption information, or the target power consumption threshold may be determined based on a specific coefficient and the operating power consumption information.

The preset condition may be that the difference between the operating power consumption information and the original power consumption threshold is not within the preset range, which indicates that the operating power consumption is too high or too low, resulting in the difference between the operating power consumption information and the original power consumption threshold not being within the preset range. correspondingly, the target power consumption threshold may be calculated and determined based on the original power consumption threshold and the set fixed value. For example, 2 watts (2 W) may be used as an adjustment gradient to increase or decrease the original power consumption threshold to obtain the target power consumption threshold.

Alternatively, change information of the operating power consumption information of the processor and the change trend of the change information may be determined based on the operating power consumption information obtained from the current detection time point and multiple previous detection time points. Correspondingly, the preset condition may be that the change trend is the increasing difference from the original power consumption threshold.

In some embodiments, the target power consumption threshold may be calculated and determined based on the operating power consumption information and a coefficient using the following formula:

$Px=Pt(1+a)$, where Px is the target power consumption threshold, Pt is the operating power consumption information, and a is the coefficient.

In some embodiments, the coefficient may be a fixed value, such as a positive decimal less than 1, or other numerical values. Using the fixed value can ensure that there is a fixed multiple relationship between the target power consumption threshold and the operating power consumption information.

In some embodiments, the value of the coefficient may also be adjusted based on actual needs such that the relationship between the target power consumption threshold and the operating power consumption information can be a non-fixed multiple.

It should be noted that by adjusting the processor's power consumption threshold to the target power consumption threshold, if the relationship between the processor's operating power consumption information and the target power consumption threshold does not meet the preset condition, the operating power consumption information and the target power consumption threshold will be close, which ensures that the power allocated to the processor can ensure the operation of the processor.

It should be noted that the electronic device may have a preset adjustment range for the power consumption threshold of the processor, and the power consumption threshold of the processor may be adjusted within the preset adjustment range.

203, adjusting the power consumption threshold of the processor from the original power consumption threshold to the target power consumption threshold to cause the processor to operate on the target power consumption threshold at least before the first detection time point.

The process at 203 is consistent with the process at 103, and will not be described again here.

Consistent with the present disclosure, if the operating power consumption information and the original power consumption threshold of the processor meet the preset condition, it indicates that the power provided by the power supply to the processor does not match the operating power consumption information of the processor during operation. Therefore, the power consumption threshold of the processor can be adjusted and the target power consumption threshold of the processor can be determined such that the power consumption threshold of the processor can be subsequently adjusted based on the target power consumption threshold, thereby ensuring that the power provided by the power supply to the processor matches the operating power consumption information of the processor during operation.

Figure 3:
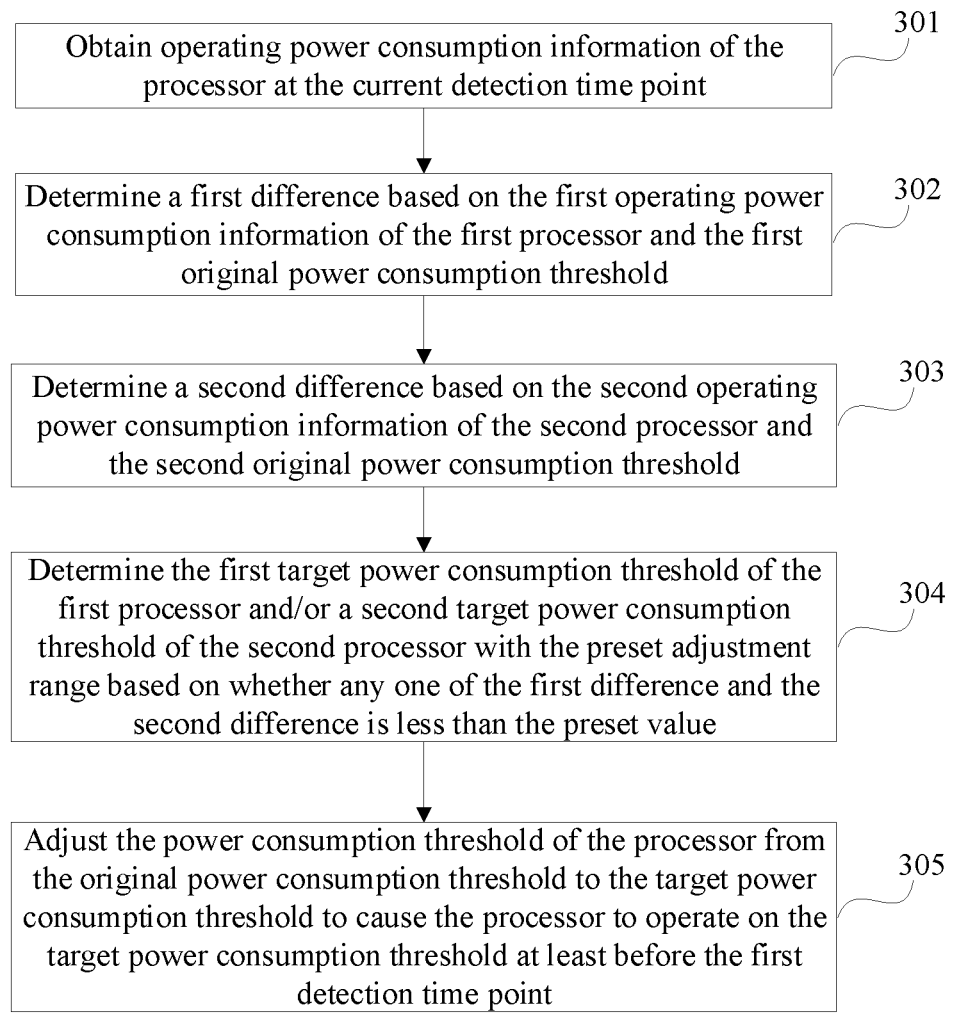
FIG. 3 is a flowchart of the control method according to an embodiment of the present disclosure.

FIG. 3 is a flowchart of the control method according to an embodiment of the present disclosure. The method will be described in detail below.

301, obtaining operating power consumption information of the processor at the current detection time point.

The process at 301 is consistent with the process at 101, and will not be described again here.

It should be noted that in some embodiments, the processor may include a first processor and a second processor.

302, determining a first difference based on the first operating power consumption information of the first processor and the first original power consumption threshold.

303, determining a second difference based on the second operating power consumption information of the second processor and the second original power consumption threshold.

In some embodiments, the adjustment method of the processor may be determined based on the difference between its operating power consumption information and the original power consumption threshold, and original power consumption thresholds of the first processor and the second processor may be different.

More specifically, the first difference may be determined based on the first operating power consumption information of the first processor and the first original power consumption threshold, and the second difference may be determined based on the second operating power consumption information of the second processor and the second original power consumption threshold respectively.

In some embodiments, the first difference may represent the difference between the operating power consumption information of the first processor and its original power consumption threshold, and the second difference may represent the difference between the operating power consumption information of the first processor and its original power consumption threshold.

In some embodiments, the greater the difference between the operating power consumption information and the original power consumption threshold, the greater the mismatch between the power consumption required for the processor operation and the power that the power supply can allocate to the processor. Therefore, it is necessary to compare the first difference, the second difference, and a preset value to determine the relationship between them.

In some embodiments, the preset value may be a value related to the operating power consumption information of the processor. For example, the preset value may be a multiple of the operating power consumption information. For example, the first original power consumption threshold may be 30% of the total power consumption, the second original power consumption threshold may be 60% of the total power consumption, the first operating power consumption information may be 25%, the second operating power consumption information may be 58%, the determined first difference may be 5%, and the determined second difference may be 2%. If the preset value is 3%, then the first difference is greater than the preset value, and the second difference is less than the preset value.

In some embodiments, when the first difference and/or the second difference is less than the preset value, it may indicate that the operating power consumption information of the corresponding processor is closer to or the same as the original power consumption threshold.

In some embodiments, the preset value may be set based on the actual needs. If the operating power consumption information and the power consumption threshold are expressed in power consumption percentage, the preset value may be a decimal from 0 to 1, generally a smaller decimal, such as 2%, 1.5%, etc. If the operating power consumption information and the power consumption threshold can be expressed by power consumption values, the preset value may be expressed as an integer or a decimal, such as 5 W, 3.2 W, etc. Of course, the value of the preset value in the specific implementation is not limited to the examples above, and the value can also be set based on the actual needs.

304, determining the first target power consumption threshold of the first processor and/or a second target power consumption threshold of the second processor with the preset adjustment range based on whether any one of the first difference and the second difference is less than the preset value.

When the first difference is less than the preset value, it may indicate that the first operating power consumption information of the first processor is close to or the same as the first original power consumption threshold. Therefore, the power consumption threshold of the first processor needs to be adjusted.

When the second difference is less than the preset value, it may indicate that the second operating power consumption information of the second processor is close to or the same as the second original power consumption threshold. Therefore, the power consumption threshold of the second processor needs to be adjusted.

In some embodiments, if one of the first difference and the second difference is less than the preset value, only the corresponding power consumption threshold of the processor corresponding to the difference less than the preset value may be adjusted. If both the first difference and the second difference are less than the preset value, it may indicate that both the first processor and the second processor have high power consumption, and a more important processor needs to be selected to ensure the more important processor is in operation when adjusting the power consumption threshold.

For example, if the first difference is less than the preset value and the second difference is not less than the preset value, the power consumption threshold of the second processor does not need to be adjusted, and the power consumption threshold of the first processor needs to be adjusted to determine the first target power consumption threshold. The first target power consumption threshold is greater than the first original power consumption threshold, and the difference between the first target power consumption threshold and the first operating power consumption information is not less than a preset value.

For example, when the first difference and the second difference are both less than the preset value, it may indicate that both the first processor and the second processor require higher power consumption. Further, if it is determined that the first processor is more important, the first target power consumption threshold may be determined. The first target power consumption threshold may be greater than the first original power consumption threshold. The second target power consumption threshold may also be determined, and the second target power consumption threshold may be less than the second original power consumption threshold. By increasing the power consumption threshold of the first processor and lowering the power consumption threshold of the second processor, the operation of the more important processor can be ensured.

It should be noted that the electronic device may have a preset adjustment range for the power consumption thresholds of the first processor and the second processor respectively, and the power consumption threshold of a certain processor can be adjusted within the corresponding preset adjustment range. This process will be described in detail in the subsequent description, and will not be described in detail here.

305, adjusting the power consumption threshold of the processor from the original power consumption threshold to the target power consumption threshold to cause the processor to operate on the target power consumption threshold at least before the first detection time point.

The process at 305 is consistent with the process at 103, and will not be described again here.

Consistent with the present disclosure, the processor may include a first processor and a second processor. The first difference can be determined based on the first operating power consumption information of the first processor and the first original power consumption threshold, the second difference can be determined based on the second operating power consumption information of the second processor and the second original power consumption threshold. The operating power consumption information of one or both of the first processor and the second processor may be close to or the same as the original power consumption threshold based on whether any one of the first difference and the second difference is less than the preset value. Therefore, the first target power consumption threshold of the first processor and/or the second target power consumption threshold of the second processor may be determined within the preset adjustment range to at least ensure that the power provided by the power supply to one of the processors can match the operating power consumption information of the processor during operation.

Figure 4:
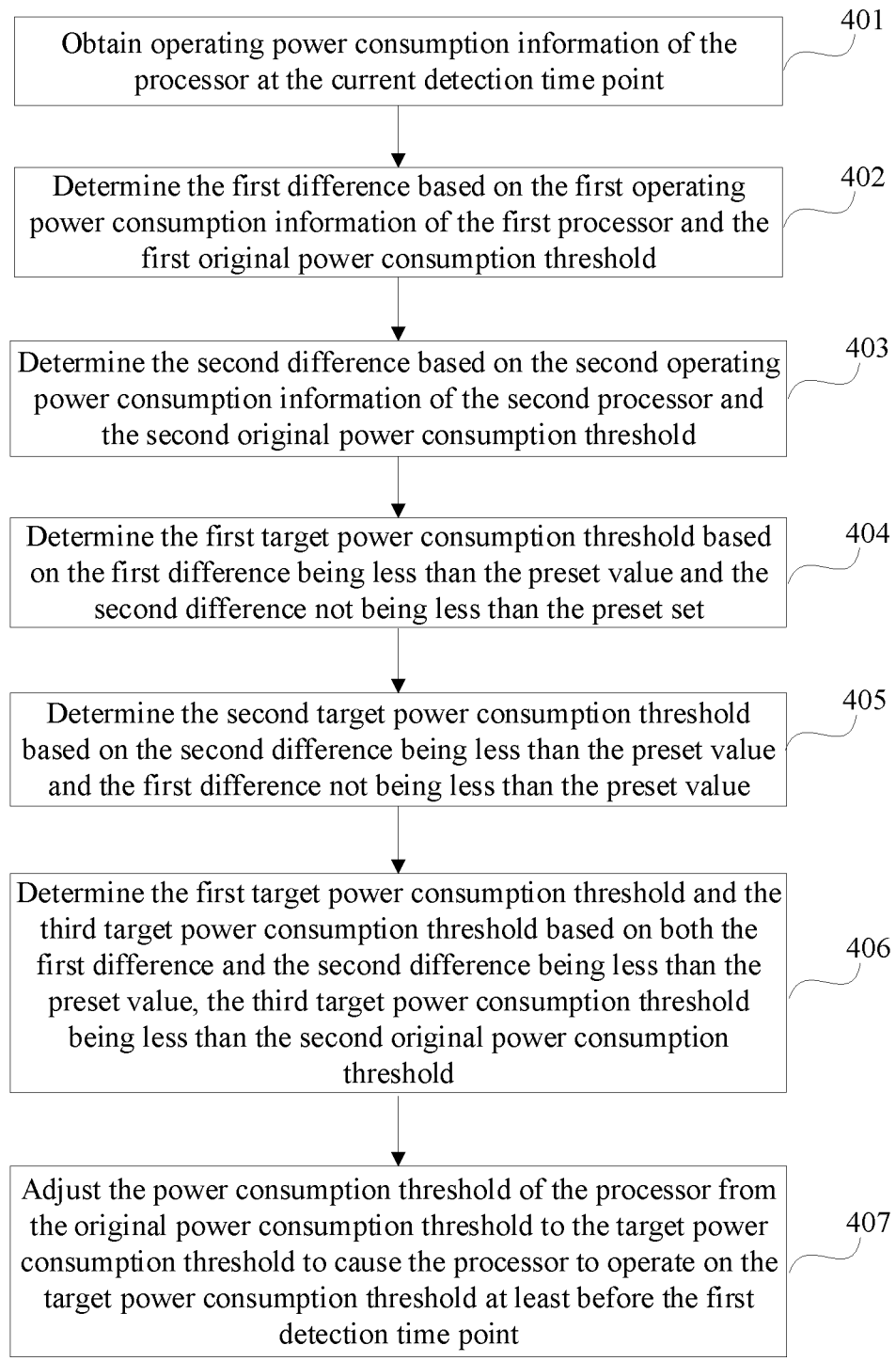
FIG. 4 is a flowchart of the control method according to an embodiment of the present disclosure.

FIG. 4 is a flowchart of the control method according to an embodiment of the present disclosure. The method will be described in detail below.

401, obtaining operating power consumption information of the processor at the current detection time point.

402, determining the first difference based on the first operating power consumption information of the first processor and the first original power consumption threshold.

403, determining the second difference based on the second operating power consumption information of the second processor and the second original power consumption threshold.

The processes at 401-403 are consistent with the processes at 301-303, and will not be described again here.

404, determining the first target power consumption threshold based on the first difference being less than the preset value and the second difference not being less than the preset set.

In some embodiments, the first target power consumption threshold may be greater than the first original power consumption threshold.

In some embodiments, the first difference being less than the preset value and the second difference not being less than the preset value may indicate that the original power consumption threshold of the first processor can no longer meet the power consumption requirements of the first processor, while the original power consumption threshold of the second processor can meet the power consumption requirements of the second processor. Therefore, the power consumption threshold of the first processor needs to be adjusted such that the power consumption threshold of the first processor can meet the power consumption requirements of the first processor.

More specifically, the first target power consumption threshold that is greater than the first original power consumption threshold may be determined such that the first processor can subsequently operate based on the first target power consumption threshold.

In some embodiments, the process at 401 may include processes at 4041-4043.

4041, determining whether the sum of the first target power consumption threshold and the second original power consumption threshold is greater than a system preset power consumption threshold based on the first difference being less than the preset value and the second difference not being less than the preset value.

In some embodiments, the power consumption threshold of the first processor may be increased after it is determined that the first difference is less than the preset value and the second difference is not less than the preset value.

However, to ensure that the increased power consumption threshold is achievable, it is necessary to ensure that the increased power consumption threshold and the power consumption threshold of the second processor meet the power consumption thresholds allocated by the system to the first processor and the second processor.

In some embodiments, an adjustment rule may be preset, and the first target power consumption threshold may be determined based on the adjustment rule.

More specifically, the adjustment rule may be a value calculated based on an agreed ratio and the operating power consumption information as the first target power consumption threshold.

In some embodiments, the first target power consumption threshold may be determined based on the preset adjustment rule. The first target power consumption threshold and the second original power consumption threshold of the second processor may be added, and the sum obtained may be compared with the system preset power consumption threshold.

In some embodiments, the system preset power consumption threshold may be the threshold of the overall power consumption that can be used by the first processor and the second processor.

In some embodiments, the system preset power consumption threshold may be a power consumption threshold allocated by the electronic device to the first processor and the second processor. For example, the power consumption threshold assigned to the first processor and the second processor may be 90% of the overall power consumption of the electronic device.

In some embodiments, the system preset power consumption threshold may also be the system preset power consumption threshold composed of the first processor and the second processor, and the system preset power consumption threshold may be 100%.

In a specific implementation, the value of the system preset power consumption threshold may be set based on actual needs. In the present disclosure, there is no limit on the value of the system preset power consumption threshold.

4042, determining the first target power consumption threshold and a third target power consumption threshold if the sum of the first target power consumption threshold and the second original power consumption threshold is greater than the system preset power consumption threshold.

In some embodiments, the third target power consumption threshold may be less than the second original power consumption threshold.

In some embodiments, if the sum of the first target power consumption threshold and the second original power consumption threshold is greater than the system preset power consumption threshold, it may indicate that the power supply cannot provide the first processor with power corresponding to the first target power consumption threshold such that the power consumption threshold of the first processor cannot be directly increased to the first target power consumption threshold.

Since the power consumption requirement priority of the first processor is higher than the second processor requirement priority of the second processor, in order to ensure the operating power consumption requirement of the first processor, the operating power consumption threshold of the second processor may be lowered. The power consumption threshold of the second processor can be lowered such that the overall power consumption threshold of the first processor and the second processor can meet the system preset power consumption threshold.

In some embodiments, the priority of the processor's power consumption requirements may be related to the priority of the processor required by the applications running in the electronic device.

For example, a gaming application may be running on an electronic device. In general, a gaming application has higher demand for graphics processing unit (GPU) than central processing unit (CPU). In this case, the first processor may be the CPU and the second processor may be the GPU. To ensure the power consumption requirements of the GPU, the power consumption threshold of the CPU can be lowered.

The third target power consumption threshold may be obtained by lowering the second original power consumption threshold. More specifically, the third target power consumption threshold may be obtained based on the difference between the system preset power consumption threshold and the first target power consumption threshold.

In some embodiments, if the power consumption priority of the first processor is lower than the power consumption priority of the second processor, the power consumption threshold of the second processor may be slightly lowered. That is, the third target power consumption threshold may be slightly lower than the second original power consumption threshold, but still ensuring the operating power consumption requirements of the second processor. The lowered power consumption threshold of the second processor may be added to the power consumption threshold of the first processor to obtain the first target power consumption threshold.

4043, determining the first target power consumption threshold if the sum of the first target power consumption threshold and the second original power consumption threshold is not greater than the system preset power consumption threshold.

In some embodiments, if the sum of the first target power consumption threshold and the second original power consumption threshold is not greater than the system preset power consumption threshold, it may indicate that the power supply can directly provide the first processor with power corresponding to the first target power consumption threshold, without adjusting the power consumption threshold of the second processor. Correspondingly, the determined first target power consumption threshold can be used as a basis for subsequent adjustment of the power consumption threshold of the first processor.

405, determining the second target power consumption threshold based on the second difference being less than the preset value and the first difference not being less than the preset value.

In some embodiments, the second target power consumption threshold may be greater than the second original power consumption threshold.

In some embodiments, if the second difference is less than the preset value and the first difference is not less than the preset value, it may indicate that the original power consumption threshold of the second processor cannot meet the power consumption requirements of the second processor, and the original power consumption threshold of the first processor can meet the power consumption requirements of the first processor. Therefore, the power consumption threshold of the second processor needs to be adjusted such that the power consumption threshold of the second processor can meet the power consumption requirements of the second processor.

More specifically, the second target power consumption threshold that is greater than the second original power consumption threshold may be determined such that the second processor can subsequently operate based on the second target power consumption threshold.

It should be noted that for the process of determining the second target power consumption threshold, reference can be made to the process of determining the first target power consumption threshold described above, which will not be repeated here.

406, determining the first target power consumption threshold and the third target power consumption threshold based on both the first difference and the second difference being less than the preset value, the third target power consumption threshold being less than the second original power consumption threshold.

In some embodiments, the power consumption requirement priority of the first processor may be higher than the power consumption requirement priority of the second processor.

In some embodiments, if both the first difference and the second difference are less than the preset value, it may indicate that the original power consumption thresholds of the first processor and the second processor can no longer meet their power consumption requirements, and the power consumption thresholds need to be adjusted. However, increasing the power consumption thresholds of both the first processor and the second processor will cause the sum of the power consumption thresholds of the two to be greater than the system preset power consumption threshold. In this way, the power supply cannot provide the corresponding power for the two processors, inhibiting the process of increasing power. Therefore, there is a need to increase the power consumption threshold of the first processor with higher power consumption priority in the first processor and the second processor. Correspondingly, the power consumption threshold needs to be adjusted to a lower level.

In some embodiments, the priority of the processor's power consumption requirements may be related to the priority of the processor required by the applications running in the electronic device.

In some embodiments, the power consumption requirements of the second processor with the lower priority for power consumption requirements may be discarded to ensure the power consumption requirements of the first processor with the higher priority for power consumption requirements. For example, a gaming application may be running on an electronic device. In general, a gaming application has higher demand for GPU than CPU. In this case, the first processor may be the CPU and the second processor may be the GPU. To ensure the power consumption requirements of the GPU, the power consumption threshold of the CPU can be lowered.

In some embodiments, the third target power consumption threshold may be obtained by lowering the second original power consumption threshold. More specifically, the third target power consumption threshold may be obtained based on the difference between the system preset power consumption threshold and the first target power consumption threshold.

407, adjusting the power consumption threshold of the processor from the original power consumption threshold to the target power consumption threshold to cause the processor to operate on the target power consumption threshold at least before the first detection time point.

The process at 407 is consistent with the process at 305, and will not be described again here.

Consistent with the present disclosure, the first target power consumption threshold can be determined based on the first difference being less than the preset value and the second difference not being less than the preset value, the first target power consumption threshold being greater than the first original power consumption threshold. The second target power consumption threshold can be determined based on the second difference being less than the preset value and the first difference not being less than the preset value, the second target power consumption threshold being greater than the second original power consumption threshold. The first target power consumption threshold and the third target power consumption threshold can be determined based on both the first difference and the second difference being less than the preset value. The third target power consumption threshold may be less than the second original power consumption threshold, and the power consumption requirement priority of the first processor may be higher than the power consumption requirement priority of the second processor. If one of the first processor and the second processor has a higher demand for power consumption, the power consumption threshold of the processor can be increased. If both processors have higher power consumption requirements, the power consumption threshold of the first processor with higher power consumption priority can be increased, and the power consumption threshold of the second processor can be lowered to ensure the overall power consumption requirements of the two processors without exceeding the system preset power consumption threshold.

Figure 5:
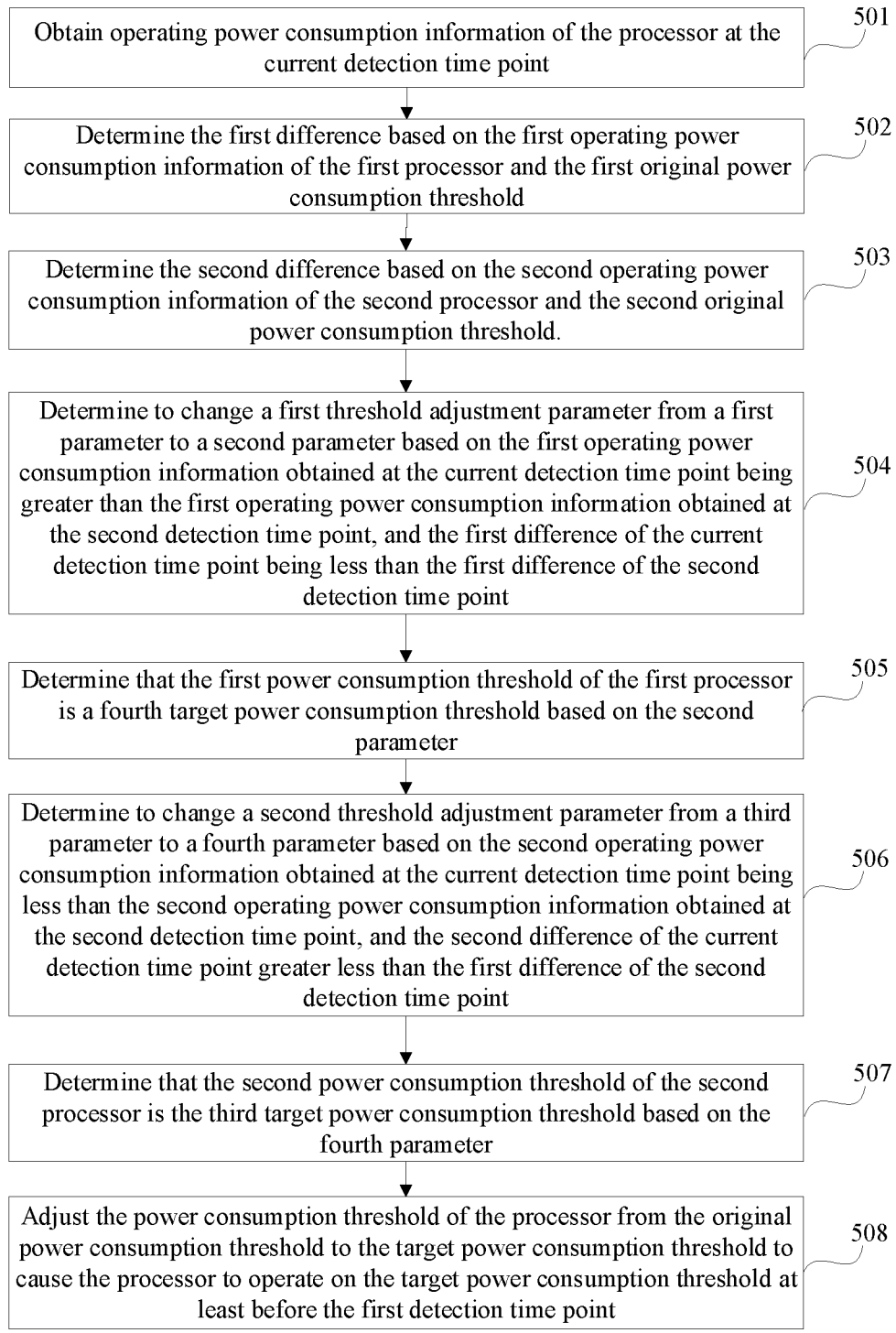
FIG. 5 is a flowchart of the control method according to an embodiment of the present disclosure.

FIG. 5 is a flowchart of the control method according to an embodiment of the present disclosure. The method will be described in detail below.

501, obtaining operating power consumption information of the processor at the current detection time point.

The process at 501 is consistent with the process at 101, and will not be described again here.

It should be noted that in some embodiments, the processor may include a first processor and a second processor.

502, determining the first difference based on the first operating power consumption information of the first processor and the first original power consumption threshold.

503, determining the second difference based on the second operating power consumption information of the second processor and the second original power consumption threshold.

In some embodiments, the adjustment method of the processor may be determined based on the difference between the operating power consumption information and the original power consumption threshold.

For the method of determining the first difference and the second difference, reference can be made to the description of processes 302-303 in the foregoing embodiments, which will not be repeated here.

504, determining to change a first threshold adjustment parameter from a first parameter to a second parameter based on the first operating power consumption information obtained at the current detection time point being greater than the first operating power consumption information obtained at the second detection time point, and the first difference of the current detection time point being less than the first difference of the second detection time point.

In some embodiments, the first parameter may correspond to the first original power consumption threshold.

In some embodiments, for the first processor, when the first operating power consumption information obtained at the current detection time point is greater than the first operating power consumption information obtained at the second detection time point, it may indicate that the first operating power consumption information of the first processor has increased.

In addition, when the first difference of the current detection time point is less than the first difference of the second detection time point, it may indicate that the difference between the first operating power consumption information of the first processor and the original power consumption threshold used at the collection time point has reduced. In this case, the first power consumption threshold of the first processor needs to be increased to ensure that the power consumption threshold of the first processor remains above the operating power consumption information.

More specifically, the first power consumption threshold may be increased by adjusting the threshold adjustment parameter.

505, determining that the first power consumption threshold of the first processor is a fourth target power consumption threshold based on the second parameter.

In some embodiments, the fourth target power consumption threshold may be less than the first original power consumption threshold.

In some embodiments, the fourth target power consumption threshold corresponding to the second parameter may be determined based on the second parameter and a preset rule. For example, the preset rule may be PCx=PCt(1+α), PCx is the first target power consumption threshold, PCt is the first operating power consumption information, and a is the coefficient. In some embodiments, the value range of α may be between 0.05 to 0.001.

In some embodiments, when α adopts the first parameter, it may be b, corresponding to the first original power consumption threshold; when α adopts the second parameter, it may be c, corresponding to the fourth original power consumption threshold, where c is greater than b.

In some embodiments, to prevent frequent adjustments which result in additional noise, it may also be necessary to confirm that the first operating power consumption information has been maintained at a higher value for a period of time before changing the first threshold adjustment parameter from the first parameter to the second parameter.

506, determining to change a second threshold adjustment parameter from a third parameter to a fourth parameter based on the second operating power consumption information obtained at the current detection time point being less than the second operating power consumption information obtained at the second detection time point, and the second difference of the current detection time point greater less than the first difference of the second detection time point.

In some embodiments, for the second processor, when the second operating power consumption information obtained at the current detection time point is less than the second operating power consumption information obtained at the second detection time point, it may indicate that the second operating power consumption information of the second processor has increased.

In addition, when the second difference of the current detection time point is greater than the second difference of the second detection time point, it may indicate that the difference between the second operating power consumption information of the second processor and the original power consumption threshold used at the collection time point has reduced. In this case, the second power consumption threshold of the second processor needs to be lowered to ensure that the power consumption threshold of the second processor remains above and close to the operating power consumption information, and does not allocate an excessively large power consumption threshold to the second processor.

More specifically, the second power consumption threshold may be lowered by adjusting the threshold adjustment parameter.

507, determining that the second power consumption threshold of the second processor is the third target power consumption threshold based on the fourth parameter.

In some embodiments, the third target power consumption threshold may be less than the second original power consumption threshold, and the third parameter may correspond to the second original power consumption threshold.

In some embodiments, the third target power consumption threshold corresponding to the fourth parameter may be determined based on the fourth parameter and the preset rule. For example, the preset rule may be PGx=PGt (1+β), PCx is the third target power consumption threshold, PGt is the second operating power consumption information, and β is the coefficient. In some embodiments, the value range of β maybe between 0.1 to 0.005.

In some embodiments, when β adopts the third parameter, it may be e, corresponding to the second original power consumption threshold; when β adopts the fourth parameter, it may be f, corresponding to the third original power consumption threshold, where e is greater than f.

In some embodiments, to prevent frequent adjustments which result in additional noise, it may also be necessary to confirm that the second operating power consumption information has been maintained at a relatively low value for a period of time before changing the second threshold adjustment parameter from the third parameter to the fourth parameter.

It should be noted that during the above adjustment process, only the first power consumption threshold of the first processor may be adjusted. That is, only the processes at 501-505 may be executed and then the process at 508 may be executed. Alternatively, only the second power consumption threshold of the second processor may be adjusted. That is, only the processes at 501-503 and 506-507 may be executed before the process at 508 is executed, or all the above processes may be executed before the process at 508 is executed.

508, adjusting the power consumption threshold of the processor from the original power consumption threshold to the target power consumption threshold to cause the processor to operate on the target power consumption threshold at least before the first detection time point.

The process at 508 is consistent with the process at 305, and will not be described again here.

Consistent with the present disclosure, the processor may include a first processor and a second processor. The first difference can be determined based on the first operating power consumption information of the first processor and the first original power consumption threshold, the second difference can be determined based on the second operating power consumption information of the second processor and the second original power consumption threshold. The first threshold adjustment parameter can be determined to be changed from the first parameter to the second parameter based on the first operating power consumption information obtained at the current detection time point being greater than the first operating power consumption information obtained at the second detection time point, and the first difference of the current detection time point being less than the first difference of the second detection time point, the first parameter corresponding to the first original power consumption threshold. The first power consumption threshold of the first processor can be determined as the fourth target power consumption threshold based on the second parameter, the fourth target power consumption threshold being less than the first original power consumption threshold. The second threshold adjustment parameter can be determined to change from the third parameter to the fourth parameter based on the second operating power consumption information obtained at the current detection time point being less than the second operating power consumption information obtained at the second detection time point, and the second difference of the current detection time point greater less than the first difference of the second detection time point. The second power consumption threshold of the second processor can be determined as the third target power consumption threshold based on the fourth parameter, the third target power consumption threshold being less than the second original power consumption threshold, the third parameter corresponding to the second original power consumption threshold. The first power consumption threshold and the second power consumption threshold can be adjusted by adjusting the first threshold adjustment parameter and the second threshold adjustment parameter.

Figure 6:
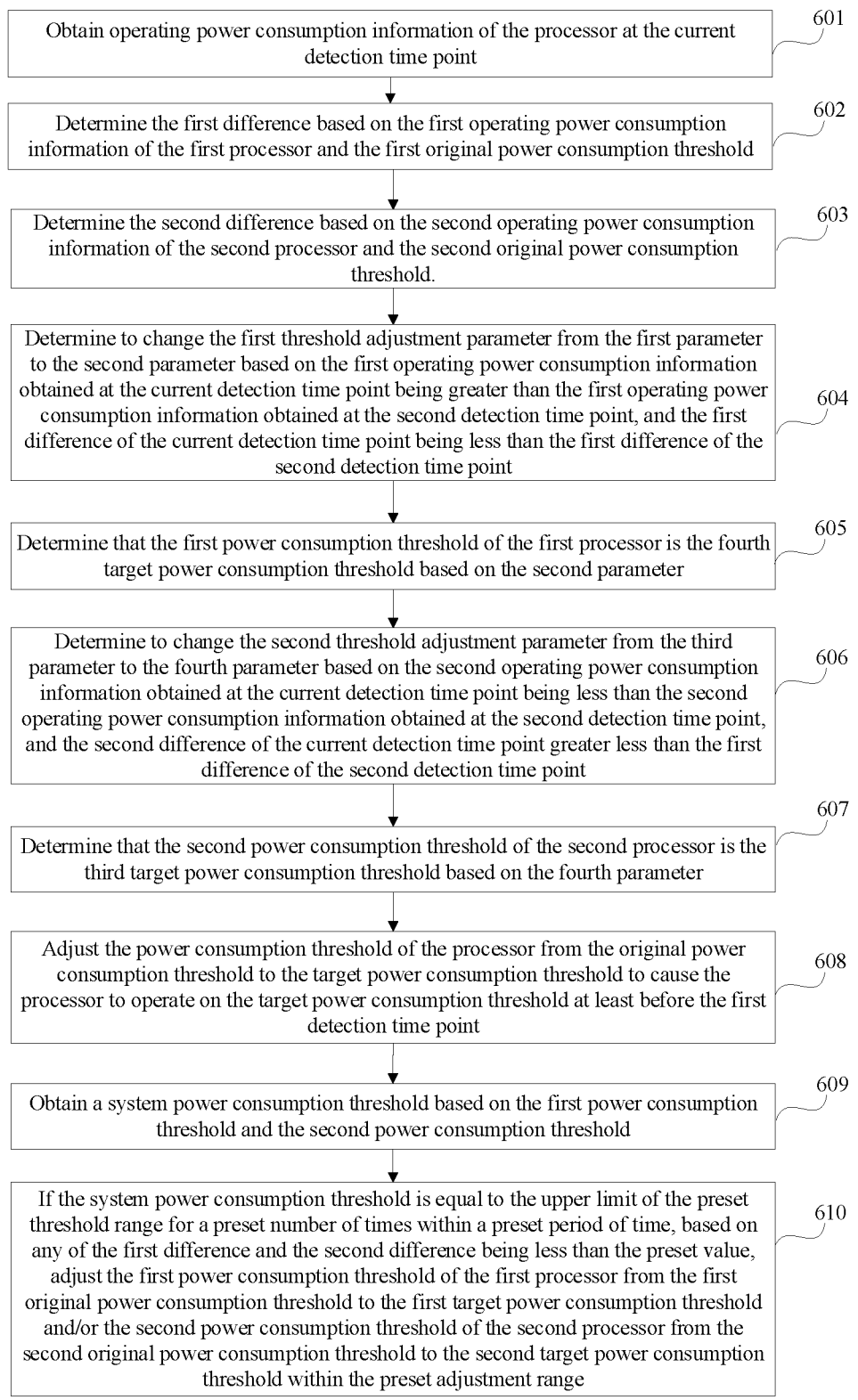
FIG. 6 is a flowchart of the control method according to an embodiment of the present disclosure.

FIG. 6 is a flowchart of the control method according to an embodiment of the present disclosure. The method will be described in detail below.

601, obtaining operating power consumption information of the processor at the current detection time point.

602, determining the first difference based on the first operating power consumption information of the first processor and the first original power consumption threshold.

603, determining the second difference based on the second operating power consumption information of the second processor and the second original power consumption threshold.

604, determining to change the first threshold adjustment parameter from the first parameter to the second parameter based on the first operating power consumption information obtained at the current detection time point being greater than the first operating power consumption information obtained at the second detection time point, and the first difference of the current detection time point being less than the first difference of the second detection time point.

605, determining that the first power consumption threshold of the first processor is the fourth target power consumption threshold based on the second parameter.

606, determining to change the second threshold adjustment parameter from the third parameter to the fourth parameter based on the second operating power consumption information obtained at the current detection time point being less than the second operating power consumption information obtained at the second detection time point, and the second difference of the current detection time point greater less than the first difference of the second detection time point.

607, determining that the second power consumption threshold of the second processor is the third target power consumption threshold based on the fourth parameter.

608, adjusting the power consumption threshold of the processor from the original power consumption threshold to the target power consumption threshold to cause the processor to operate on the target power consumption threshold at least before the first detection time point.

The processes at 601-608 are consistent with the processes at 501-508, and will not be described again here.

609, obtaining a system power consumption threshold based on the first power consumption threshold and the second power consumption threshold.

In some embodiments, the first power consumption threshold may be the power consumption threshold adopted by the first processor. If the power consumption threshold for the first processor is adjusted in the preceding processes, the adjusted first target power consumption threshold may be used as the first power consumption threshold. If the first power consumption threshold is not adjusted, the first original power consumption threshold may be used.

Correspondingly, the second power consumption threshold may be the power consumption threshold adopted by the second processor. If the power consumption threshold for the second processor is adjusted in the preceding processes, the adjusted second target power consumption threshold may be used as the second power consumption threshold. If the second power consumption threshold is not adjusted, the second original power consumption threshold may be used.

By adjusting the first power consumption threshold and/or the second power consumption threshold at each detection time point, the sum of the first power consumption threshold and the second power consumption threshold after each adjustment can be calculated to obtain the system power consumption threshold of the system composed of the first processor and the second processor.

In some embodiments, the system power consumption threshold may fluctuate within a preset threshold range.

More specifically, there is an upper limit within the preset threshold range, and the system power consumption threshold can reach the upper limit.

In some embodiments, after each adjustment of the power consumption threshold, the system power consumption threshold can be calculated to determine whether the system power consumption threshold reaches the upper limit of the threshold range, if so, the count can be increased by one.

610, if the system power consumption threshold is equal to the upper limit of the preset threshold range for a preset number of times within a preset period of time, based on any of the first difference and the second difference being less than the preset value, adjusting the first power consumption threshold of the first processor from the first original power consumption threshold to the first target power consumption threshold and/or the second power consumption threshold of the second processor from the second original power consumption threshold to the second target power consumption threshold within the preset adjustment range.

In some embodiments, if the system power consumption threshold is equal to the upper limit of the preset threshold range for the preset number of times within a preset period of time, it may indicate that the system power consumption threshold representing the overall power consumption of the first processor and the power consumption corresponds to the maximum capability of the system. In this way, the upper limit of the system's preset threshold range can be used as the system power consumption threshold. This process can realize upper limit fitting of the power consumption of the two processors, remove the glitches in the request, prevent the sudden increase in noise caused by a surge in system power, and enable a smooth transition of power, ultimately reaching the highest performance mode.

For example, the system power consumption threshold range may be 130 W to 180 W. If the system power consumption threshold reaches 180 W 10 times within 2 hours, the 180 W can be used as the system power consumption threshold to adjust the first power consumption threshold of the first processor and the second power consumption threshold of the second processor.

The system power consumption threshold range is not limited to the example in this embodiment, and other values can also be used. The value of the preset period of time can also be other lengths, which is not limited to the embodiments of the present disclosure.

For the power consumption threshold adjustment process, reference can be made to the description provided in the foregoing embodiments, which will not be repeated again here.

Consistent with the present disclosure, the system power consumption threshold can be obtained based on the first power consumption threshold and the second power consumption threshold. If the system power consumption threshold is equal to the upper limit of the preset threshold range for a preset number of times within a preset period of time, based on any of the first difference and the second difference being less than the preset value, the first power consumption threshold of the first processor from the first original power consumption threshold to the first target power consumption threshold and/or the second power consumption threshold of the second processor can be adjusted from the second original power consumption threshold to the second target power consumption threshold within the preset adjustment range. The system power consumption threshold can be calculated based on the power consumption thresholds of the first processor and the second processor. Based on the system power consumption threshold reaching the upper limit of the preset threshold range multiple times in a short period of time, the upper limit of the preset threshold range can be used as the system preset power consumption threshold to adjust the power consumption thresholds of the first processor and the second processor based on the system power consumption threshold. In this way, the upper limit fitting for the power consumption of the two processors can be realized, the glitches in the request can be removed, the sudden increase in noise caused by a surge in system power can be prevented, thereby enabling a smooth transition of power, ultimately reaching the highest performance mode.

Figure 7:
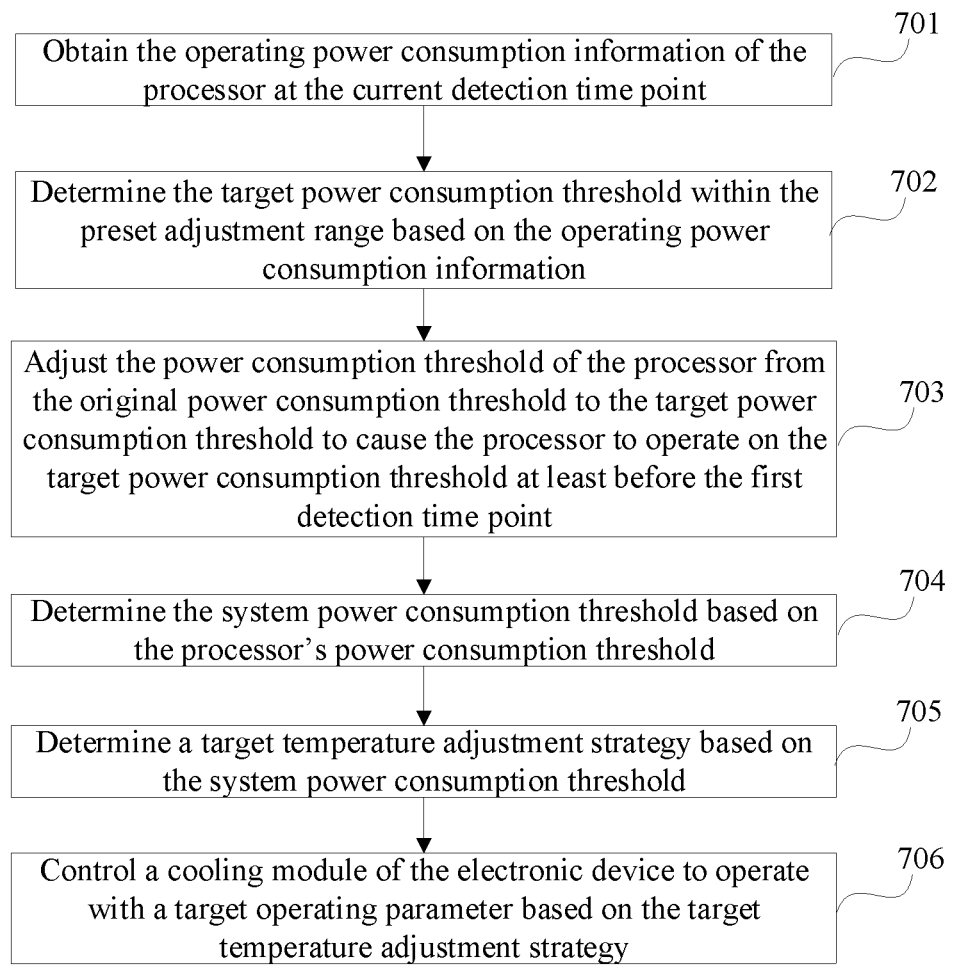
FIG. 7 is a flowchart of the control method according to an embodiment of the present disclosure.

FIG. 7 is a flowchart of the control method according to an embodiment of the present disclosure. The method will be described in detail below.

701, obtaining the operating power consumption information of the processor at the current detection time point.

702, determining the target power consumption threshold within the preset adjustment range based on the operating power consumption information.

703, adjusting the power consumption threshold of the processor from the original power consumption threshold to the target power consumption threshold to cause the processor to operate on the target power consumption threshold at least before the first detection time point.

The processes at 701-703 are consistent with the processes at 101-103, and will not be described again here.

704, determining the system power consumption threshold based on the processor's power consumption threshold.

In some embodiments, the electronic device may include a plurality of processors, such as CPU, GPU, etc.

In a specific implementation, the electronic device may also include other components other than the processors, and each component may also consume power during operation.

More specifically, based on the power consumption threshold of the processor and the power consumption of other components, the system preset power consumption threshold of the electronic device can be calculated.

705, determining a target temperature adjustment strategy based on the system power consumption threshold.

In some embodiments, different temperature adjustment strategies corresponding to different system power consumption ranges may be set in the electronic device.

More specifically, the system power consumption range to which the preset power consumption value of the system belongs may be determined, and then the temperature adjustment strategy corresponding to the system power consumption range may be determined as the target temperature adjustment strategy.

For example, the power consumption ranges may be: [0, 50 W], (50 W, 80 W], (80 W, 100 W], . . . (160 W, 180 W]. Different temperature adjustment strategies may be set for different power consumption ranges. For example, if the system's preset power consumption threshold is 87 W, the temperature adjustment strategy corresponding to (80 W, 100 W] can be determined as the target temperature adjustment strategy.

706, controlling a cooling module of the electronic device to operate with a target operating parameter based on the target temperature adjustment strategy.

In some embodiments, the temperature adjustment strategy may be used to control the operating parameters of the cooling module of the electronic device such that the cooling module can dissipate the heat generated during the operation of the processor of the electronic device to achieve cooling of the electronic device.

In some embodiments, the temperature adjustment strategy may be used to control the operating parameters of the cooling module.

In some embodiments, the cooling module may be a fan in the electronic device, and the operating parameters may be the speed of the fan. Different temperature adjustment strategies may correspond to different maximum speed and minimum speed ranges of the fan speed.

In some embodiments, in each temperature strategy, different temperature ranges may correspond to different speed ranges.

For example, the speed corresponding to the temperature adjustment strategy corresponding to less than 50 W may include the minimum rotational speed of 1200 rpm, 1500 rpm, 2000 rpm, 2200 rpm, 2400 rpm, 2600 rpm, 3000 rpm, 3200 rpm, 3400 rpm, and 4100 rpm;

and, the maximum rotational speed of 2500 rpm, 2500 rpm, 2500 rpm, 2500 rpm, 3000 rpm, 3400 rpm, 3400 rpm, 3600 rpm, 3800 rpm, and 4500 rpm.

In some embodiments, when the temperature is at the L1 level, the minimum fan speed may be 1200 rpm and the maximum fan speed may be 2500 rpm. When the temperature is at the L10 level, the minimum fan speed may be 4100 rpm and the maximum fan speed may be 4500 rpm.

In some embodiments, the target operating parameters of the fan may be a value in the rotational speed range consisting of any maximum rotational speed and any minimum rotational speed described above.

Consistent with the present disclosure, the system preset power consumption value can be determined based on the processor's power consumption threshold. The target temperature adjustment strategy can be determined based on the preset power consumption value of the system, and then the cooling module in the electronic device can be controlled to operate with the target operating parameters base on the target temperature adjustment strategy. In this way, the adjustment of the operation of the cooling module can be realized based on the power consumption threshold of the processor in the electronic device, and the temperature of the device can be reduced while ensuring the stability of the device system.

Figure 8:
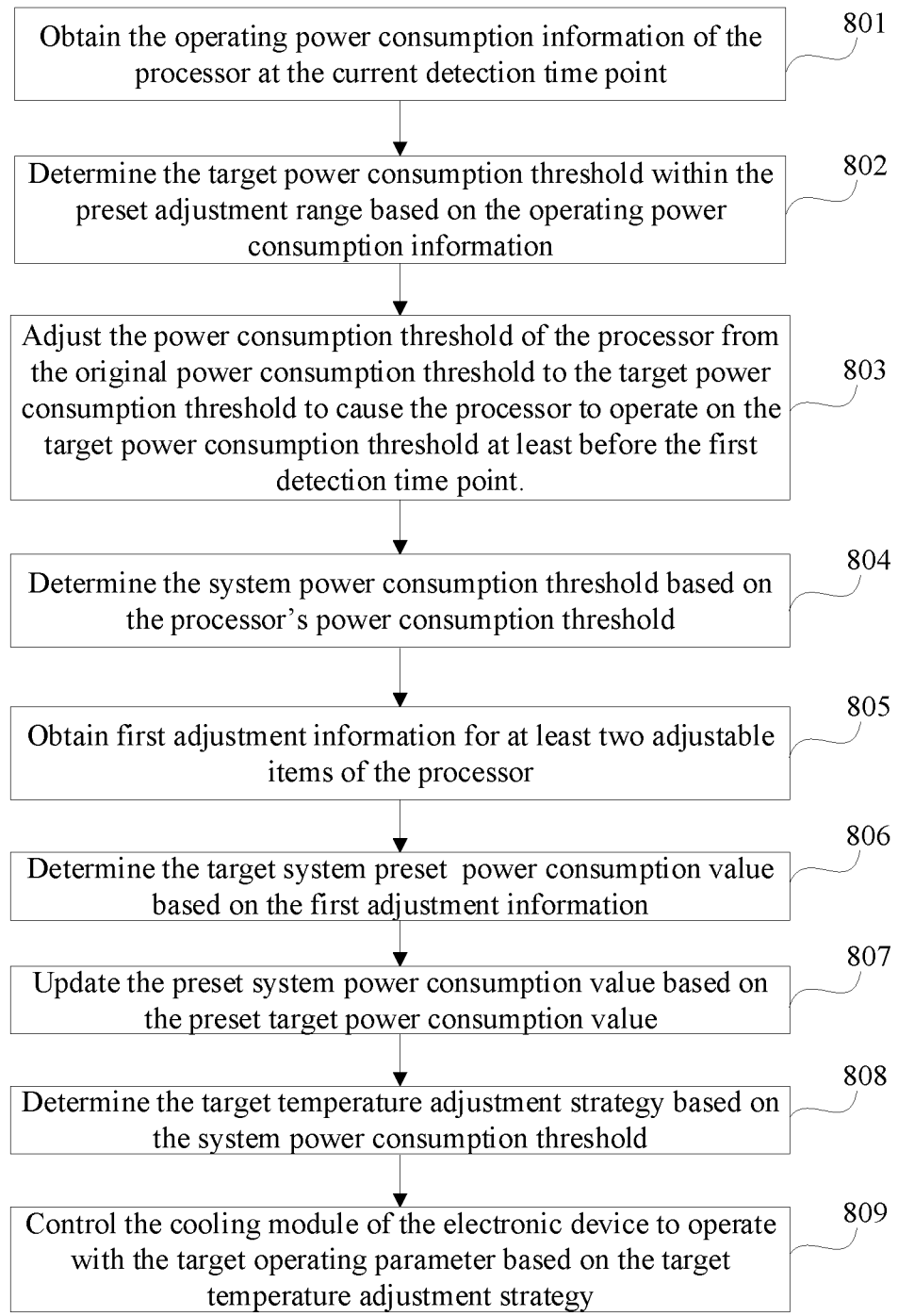
FIG. 8 is a flowchart of the control method according to an embodiment of the present disclosure.

FIG. 8 is a flowchart of the control method according to an embodiment of the present disclosure. The method will be described in detail below.

801, obtaining the operating power consumption information of the processor at the current detection time point.

802, determining the target power consumption threshold within the preset adjustment range based on the operating power consumption information.

803, adjusting the power consumption threshold of the processor from the original power consumption threshold to the target power consumption threshold to cause the processor to operate on the target power consumption threshold at least before the first detection time point.

804, determining the system power consumption threshold based on the processor's power consumption threshold.

The processes at 801-804 are consistent with the processes at 701-703, and will not be described again here.

805, obtaining first adjustment information for at least two adjustable items of the processor.

In some embodiments, the first adjustment information may be generated based on the operator input operation, and the adjustable items may be related to the power consumption threshold of the processor.

In some embodiments, the power consumption threshold of the processor in the electronic device may be adjusted based on the first adjustment information input by the user.

More specifically, the operating body can be used to perform an input operation. The input operation may be to adjust at least two adjustable items of the processor, and the electronic device may generate the first adjustment information based on the input operation.

In some embodiments, the processor may include a first processor and a second processor, and the operating body may be used to respectively perform input operations on the relevant adjustable items of the two processors to adjust the values of the adjustable items of the two processors.

In some embodiments, the adjustable items may at least include the power consumption setting value of the first processor when the first processor and the second processor are fully loaded at the same time.

In some embodiments, the adjustable items may also include the CPU trigger point of dynamic boost technology (PPAB) and other items.

In some embodiments, based on the model of each processor, the electronic device may prepare the adjustable item data and write it into the basic input output system (BIOS) to display the adjustable item data such that the user can adjust the adjustable items based on the displayed adjustable item data.

806, determining the target system preset power consumption value based on the first adjustment information.

In some embodiments, based on the first adjustment information of the processor, a system preset power consumption value in the electronic device may be calculated.

The electronic device may also have power consumption from other components. The power consumption of the other components may be calculated from the power consumption value of the processor determined by the first adjustment information to obtain the system preset power consumption value.

In some embodiments, the two processors in the electronic device may be CPU and GPU.

More specifically, if an Nvidia card is used, different calculation methods can be used to calculate the preset power consumption value of the target system based on the relationship between the CPU trigger point of PPAT and the power consumption value of the CPU in the electronic device when the CPU and the GPU are fully loaded at the same time.

In some embodiments, the CPU trigger point of PPAB may be a setting value of the adjustable item.

If in DGPU, the CPU trigger point of PPAB is less than or equal to the power consumption value of the CPU in the electronic device when the CPU and the GPU are fully loaded at the same time, then the system preset power consumption value may be equal to the power consumption value of the CPU in the electronic device when the CPU and the GPU are fully loaded at the same time plus the DGPU basic power consumption and the graphics card power consumption setting value.

If in DGPU, the CPU trigger point of PPAB is greater than the power consumption value of the CPU in the electronic device when the CPU and the GPU are fully loaded at the same time, then the system preset power consumption value may be equal to the power consumption value of the CPU in the electronic device when the CPU and the GPU are fully loaded at the same time plus the DGPU basic power consumption, the graphics card power consumption setting value, and the dynamic boost power consumption.

In some embodiments, the DGPU basic power consumption may be a fixed value, which is generally determined by the BIOS based on the actual power consumption of the system.

In some embodiments, the graphics card power consumption setting value (configurable TGP) and the dynamic boot power consumption may also be the adjustable items, and their values may be adjusted by the user.

In some embodiments, if AMD is used, the total power consumption of the AMD_CPU+AMD_GPU system may be equal to the power consumption value set for the CPU and the GPU in the system. The set power consumption value may be adjusted by the user.

For example, if AMD is used, Platform SPL or STT_Min-Limit STT2.0 in the system parameters may be used to indicate the set power consumption values for the CPU and GPU.

807, updating the preset system power consumption value based on the preset target power consumption value.

In some embodiments, based on the preset system power consumption value calculated by each component in the electronic device and the processor, the preset system power consumption value may be updated in the system of the electronic device such that the preset system power consumption value can correspond to the processor power consumption threshold adjusted by the operating body.

It should be noted that the preset system power consumption value may refer to the power consumption when the system is fully loaded after the user adjusts the parameters, rather than the real-time power consumption.

808, determining the target temperature adjustment strategy based on the system power consumption threshold.

809, controlling the cooling module of the electronic device to operate with the target operating parameter based on the target temperature adjustment strategy.

The processes at 808-809 are consistent with the processes at 705-706, and will not be described again here.

Consistent with the present disclosure, the first adjustment information for at least two adjustable items of the processor can be obtained. The first adjustment information can be generated based on the operator input operation, and the adjustable items can be related to the power consumption threshold of the processor. The target system preset power consumption value can be determined based on the first adjustment information. The preset system power consumption value can be updated based on the target system preset power consumption value. The adjustable items of the processor in the electronic device can be adjusted based on the input operation performed by the operating body to obtain the first adjustment information to adjust the power consumption threshold of the processor. The target system preset power consumption value can be determined based on the obtained first adjustment information. The target system preset power consumption value of the electronic device can be obtained after adjusting the adjustable items, and the preset system power consumption value of the electronic device can be updated. Subsequently, the target temperature adjustment strategy can be determined based on the preset system power consumption value. In this way, the adjustment of the adjustable items can be realized by the user adjusting the power consumption threshold of the processor, and the change of the target temperature adjustment strategy can also be realized, thereby making the temperature adjustment strategy more suitable for the power consumption during the operation of the electronic device.

Figure 9:
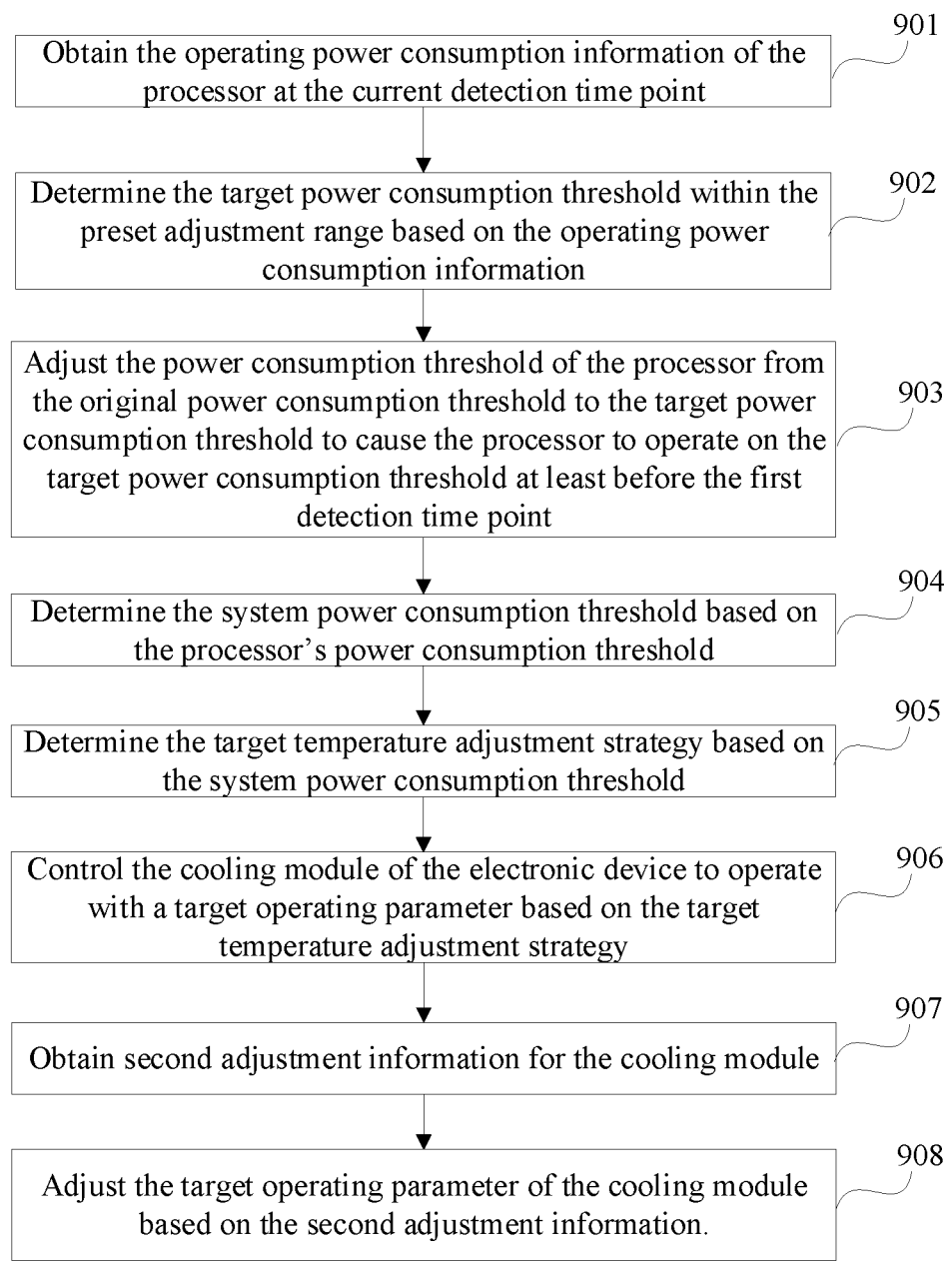
FIG. 9 is a flowchart of the control method according to an embodiment of the present disclosure.

FIG. 9 is a flowchart of the control method according to an embodiment of the present disclosure. The method will be described in detail below.

901, obtaining the operating power consumption information of the processor at the current detection time point.

902, determining the target power consumption threshold within the preset adjustment range based on the operating power consumption information.

903, adjusting the power consumption threshold of the processor from the original power consumption threshold to the target power consumption threshold to cause the processor to operate on the target power consumption threshold at least before the first detection time point.

904, determining the system power consumption threshold based on the processor's power consumption threshold.

905, determining the target temperature adjustment strategy based on the system power consumption threshold.

906, controlling the cooling module of the electronic device to operate with a target operating parameter based on the target temperature adjustment strategy.

The processes at 901-906 are consistent with the processes at 701-706, and will not be described again here.

907, obtaining second adjustment information for the cooling module.

In some embodiments, the second adjustment information may be generated based on the input operation of the operating body, and the second adjustment information may be used to adjust the working performance of the cooling module within a performance adjustment range corresponding to the target temperature adjustment strategy.

More specifically, an operating body may be used to perform an input operation. The input operation may be an operation to adjust the functional performance of the cooling module within the performance adjustment range corresponding to the target temperature adjustment strategy.

In some embodiments, when the cooling module uses a fan, the second adjustment information may be the adjustment information for adjusting the rotational speed of the fan.

More specifically, the user may input a fan rotational speed, and the electronic device can obtain fan rotational speed and use the fan rotational speed as the second adjustment information.

In some embodiments, the fan rotational speed input by the user must be within the fan speed range corresponding to the target temperature adjustment strategy.

In some embodiments, two methods may be used to ensure that the value input by the user is within the speed range corresponding to the target temperature adjustment strategy. In the first method, the acceptable input range can be displayed on an input interface. In the second method, the user can directly input a value into the input interface. If the value is not within the rotational speed range corresponding to the target temperature adjustment strategy, a message can be generated to prompt the user about the acceptable input range.

908, adjusting the target operating parameter of the cooling module based on the second adjustment information.

In some embodiments, the corresponding operating parameters in the cooling module may be updated based on the obtained second adjustment information.

More specifically, when the second adjustment information is the input fan rotational speed and the target operating parameter of the cooling module is the fan rotational speed, the fan speed of the cooling module can be updated based on the input fan rotational speed.

For example, the speed corresponding to the temperature adjustment strategy corresponding to less than 50 W may include the minimum rotational speed of 1200 rpm, 1500 rpm, 2000 rpm, 2200 rpm, 2400 rpm, 2600 rpm, 3000 rpm, 3200 rpm, 3400 rpm, and 4100 rpm; and, the maximum rotational speed of 2500 rpm, 2500 rpm, 2500 rpm, 2500 rpm, 3000 rpm, 3400 rpm, 3400 rpm, 3600 rpm, 3800 rpm, and 4500 rpm.

In some embodiments, when the temperature is at the L1 level, the corresponding fan speed range may be between 1200 rpm to 2500 rpm, and the current fan speed may be 1500 rpm. Since the user perceives that the temperature of the device is relatively high and there is a need to cool down the device, the user can input the second adjustment information to increase the fan speed. The fan speed input by the user may be 2000 rpm, which is within the fan speed range. The electronic device can respond to the input fan speed and adjust the fan speed to 2000 rpm.

It should be noted that after adjusting the target operating parameters of the cooling module, the target temperature adjustment strategy with adjusted target operating parameters will be used as the adjusted target temperature adjustment strategy. The adjustment strategy based on the adjusted target temperature can be stored in the BOIS such that the BIOS can control the cooling module to operate based on the adjusted target operating parameters.

Consistent with the present disclosure, the operating body can be used to perform an input operation on the cooling module to obtain the second adjustment information for the cooling module. The second adjustment information can be used to adjust the working performance of the cooling module within the performance adjustment range corresponding to the target temperature adjustment strategy. The target operating parameters of the cooling module can be adjusted based on the second adjustment information, and the user can manually adjust the operating parameters of the cooling module. In this way, the parameters of the target temperature adjustment strategy can be adjusted to make the operation of the cooling module more suitable for the user's needs.

corresponding to the foregoing embodiment of the control method, the present disclosure also provides an electronic device and a computer-readable storage medium corresponding to the control method. The electronic device includes a memory and a processor. The memory stores a processing program. The processor may be configured to load and execute the processing program stored in the memory to implement each step of the control method described in the foregoing embodiment. For the specific implementation of the control method of the electronic device, reference can be made to the foregoing control method embodiment.

In some embodiments, the computer-readable storage medium has a computer program stored thereon, and the computer program can be called and executed by the processor to implement each step of the control method described in the foregoing embodiment.

More specifically, the computer program stored in the computer-readable storage medium can be executed to perform the control method described above. For detail, reference can be made to the foregoing control method embodiment.

The embodiments in this specification are described in a progressive way, each of which emphasizes the differences from others, and the same or similar parts among the embodiments can be referred to each other. Since the electronic device disclosed in the embodiments corresponds to the method therein, the description thereof is relatively simple, and for relevant matters references may be made to the description of the method.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. A control method comprising:
   obtaining operating power consumption information of a processor at a current detection time point;
   determining a target power consumption threshold within a preset adjustment range based on the operating power consumption information and an adjustable coefficient ($\alpha$), wherein the target power consumption threshold is determined based on a relationship in which the target power consumption threshold is equal to the operating power consumption information multiplied by a factor of $(1+\alpha)$; and
   adjusting a power consumption threshold of the processor from an original power consumption threshold to the target power consumption threshold to cause the processor to operate based on the target power consumption threshold before a first detection time point, wherein:
   the original power consumption threshold is the power consumption threshold used by the processor from a second detection time point to the current detection time point, the first detection time point is later than the current detection time point and adjacent to the current detection time point, the second detection time point is earlier than the current detection time point and adjacent to the current detection time point, the power consumption threshold is an upper limit of the power consumption for the processor during operation.

2. The control method of claim 1, wherein determining the target power consumption threshold within the preset adjustment range based on the operating power consumption information includes:
   determining the target power consumption threshold of the processor within the preset adjustment range in response to the operating power consumption information and the original power consumption threshold of the processor meeting a preset condition, and the operating power consumption information and the target power consumption threshold not meeting the preset condition.

3. The control method of claim 1, wherein:
   the processor includes a first processor and a second processor, and
   determining the target power consumption threshold within the preset adjustment range based on the original power consumption threshold includes:
   determining a first difference based on first operating power consumption information of the first processor and a first original power consumption threshold;
   determining a second difference based on second operating power consumption information of the second processor and a second original power consumption threshold; and
   determining a first target power consumption threshold of the first processor and/or a second target power consumption threshold of the second processor within the preset adjustment range based on any one of the first difference and the second difference being less than a preset value.

4. The control method of claim 3, wherein determining the first target power consumption threshold of the first processor and/or the second target power consumption threshold of the second processor within the preset adjustment range based on any one of the first difference and the second difference being less than the preset value includes:
    determining the first target power consumption threshold based on the first difference being less than the preset value and the second difference not being less than the preset value, the first target power consumption threshold being greater than the first original power consumption threshold;
    determining the second target power consumption threshold based on the second difference being less than the preset value and the first difference not being less than the preset value, the second target power consumption threshold being greater than the second original power consumption threshold; and
    determining the first target power consumption threshold and a third target power consumption threshold based on both the first difference and the second difference being less than the preset value, the third target power consumption threshold being less than the second original power consumption threshold, a power consumption requirement priority of the first processor being higher than a power consumption requirement priority of the second processor.

5. The control method of claim 4, wherein determining the first target power consumption threshold includes:
    determining whether a sum of the first target power consumption threshold and the second original power consumption threshold is greater than a system preset power consumption threshold;
    determining the first target power consumption threshold and the third target power consumption threshold if the sum of the first target power consumption threshold and the second original power consumption threshold is greater than the system preset power consumption threshold; and
    determining the first target power consumption threshold if the sum of the first target power consumption threshold and the second original power consumption threshold is less than or equal to the system preset power consumption threshold.

6. The control method of claim 1, wherein:
    the processor includes a first processor and a second processor, and
    determining the target power consumption threshold within the preset adjustment range based on the original power consumption threshold includes:
    determining a first difference based on first operating power consumption information of the first processor and a first original power consumption threshold;
    determining a second difference based on second operating power consumption information of the second processor and a second original power consumption threshold; and
    determining to change a first threshold adjustment parameter from a first parameter to a second parameter based on the first operating power consumption information obtained at the current detection time point being greater than the first operating power consumption information obtained at the second detection time point, and the first difference at the current detection time point being less than the first difference at the second detection time point, the first parameter corresponding to the first original power consumption threshold;
    determining that a first power consumption threshold of the first processor is a fourth target power consumption threshold based on the second parameter, the fourth target power consumption threshold being greater than the first original power consumption threshold; and/or
    determining to change a second threshold adjustment parameter from a third parameter to a fourth parameter based on the second operating power consumption information obtained at the current detection time point being less than the second operating power consumption information obtained at the second detection time point, and the second difference at the current detection time point being greater than the second difference at the second detection time point; and
    determining that a second power consumption threshold of the second processor is a third target power consumption threshold based on the fourth parameter, the third target power consumption threshold being less than the second original power consumption threshold, the third parameter corresponding to the second original power consumption threshold.

7. The control method of claim 6 further comprising:
    obtaining a system power consumption threshold based on the first power consumption threshold and the second power consumption threshold; and
    when a number of times that the system power consumption threshold reaches the upper limit of a preset threshold range within a preset period of time reaches a preset number, adjusting the first power consumption threshold of the first processor from the first original power consumption threshold to the first target power consumption threshold and/or adjusting the second power consumption threshold of the second processor from the second original power consumption threshold to the second target power consumption threshold within the preset adjustment range based on any of the first difference and the second difference being less than the preset value.

8. The control method of claim 1 further comprising:
    determining a system preset power consumption value based on the power consumption threshold of the processor;
    determining a target temperature adjustment strategy based on the system preset power consumption value; and
    controlling a cooling module of an electronic device to operate with a target operating parameter based on the target temperature adjustment strategy.

9. The control method of claim 8, wherein after determining the system preset power consumption value based on the power consumption threshold of the processor, and before determining the target temperature adjustment strategy based on the system preset power consumption value, further comprising:
    obtaining first adjustment information for at least two adjustable items of the processor, the first adjustment information being generated based on an input operation performed on an operating body, the at least two adjustable items being related to the power consumption threshold of the processor; and
    determining the system preset power consumption value of a target system based on the first adjustment information.

10. The control method of claim 8, wherein after controlling the cooling module of the electronic device based on the target temperature adjustment strategy to operate with the target operating parameter, further comprising:
  obtaining second adjustment information for the cooling module, the second adjustment information being generated based on the input operation of the operating body, the second adjustment information being used to adjust working performance of the cooling module within a performance adjustment range corresponding to the target temperature adjustment strategy; and
  adjusting the target operating parameter of the cooling module based on the second adjustment information.

11. A non-transitory computer-readable storage medium containing computer-executable instructions, when executed by one or more processors, the computer-executable instructions performing a control method comprising:
  obtaining operating power consumption information of a processor at a current detection time point;
  determining a target power consumption threshold within a preset adjustment range based on the operating power consumption information and an adjustable coefficient ($\alpha$), wherein the target power consumption threshold is determined based on a relationship in which the target power consumption threshold is equal to the operating power consumption information multiplied by a factor of $(1+\alpha)$; and
  adjusting a power consumption threshold of the processor from an original power consumption threshold to the target power consumption threshold to cause the processor to operate based on the target power consumption threshold before a first detection time point, wherein:
  the original power consumption threshold is the power consumption threshold used by the processor from a second detection time point to the current detection time point, the first detection time point is later than the current detection time point and adjacent to the current detection time point, the second detection time point is earlier than the current detection time point and adjacent to the current detection time point, the power consumption threshold is an upper limit of the power consumption for the processor during operation.

12. The non-transitory computer-readable storage medium of claim 11, wherein determining the target power consumption threshold within the preset adjustment range based on the operating power consumption information includes:
  determining the target power consumption threshold of the processor within the preset adjustment range in response to the operating power consumption information and the original power consumption threshold of the processor meeting a preset condition, and the operating power consumption information and the target power consumption threshold not meeting the preset condition.

13. The non-transitory computer-readable storage medium of claim 11, wherein:
  the processor includes a first processor and a second processor, and
  determining the target power consumption threshold within the preset adjustment range based on the original power consumption threshold includes:
    determining a first difference based on first operating power consumption information of the first processor and a first original power consumption threshold;
    determining a second difference based on second operating power consumption information of the second processor and a second original power consumption threshold; and
    determining a first target power consumption threshold of the first processor and/or a second target power consumption threshold of the second processor within the preset adjustment range based on any one of the first difference and the second difference being less than a preset value.

14. The non-transitory computer-readable storage medium of claim 13, wherein determining the first target power consumption threshold of the first processor and/or the second target power consumption threshold of the second processor within the preset adjustment range based on any one of the first difference and the second difference being less than the preset value includes:
  determining the first target power consumption threshold based on the first difference being less than the preset value and the second difference not being less than the preset value, the first target power consumption threshold being greater than the first original power consumption threshold;
  determining the second target power consumption threshold based on the second difference being less than the preset value and the first difference not being less than the preset value, the second target power consumption threshold being greater than the second original power consumption threshold; and
  determining the first target power consumption threshold and a third target power consumption threshold based on both the first difference and the second difference being less than the preset value, the third target power consumption threshold being less than the second original power consumption threshold, a power consumption requirement priority of the first processor being higher than a power consumption requirement priority of the second processor.

15. The non-transitory computer-readable storage medium of claim 14, wherein determining the first target power consumption threshold includes:
  determining whether a sum of the first target power consumption threshold and the second original power consumption threshold is greater than a system preset power consumption threshold;
  determining the first target power consumption threshold and the third target power consumption threshold if the sum of the first target power consumption threshold and the second original power consumption threshold is greater than the system preset power consumption threshold; and
  determining the first target power consumption threshold if the sum of the first target power consumption threshold and the second original power consumption threshold is less than or equal to the system preset power consumption threshold.

16. The non-transitory computer-readable storage medium of claim 11, wherein:
  the processor includes a first processor and a second processor, and
  determining the target power consumption threshold within the preset adjustment range based on the original power consumption threshold includes:
    determining a first difference based on first operating power consumption information of the first processor and a first original power consumption threshold;

determining a second difference based on second operating power consumption information of the second processor and a second original power consumption threshold; and determining to change a first threshold adjustment parameter from a first parameter to a second parameter based on the first operating power consumption information obtained at the current detection time point being greater than the first operating power consumption information obtained at the second detection time point, and the first difference at the current detection time point being less than the first difference at the second detection time point, the first parameter corresponding to the first original power consumption threshold;

determining that a first power consumption threshold of the first processor is a fourth target power consumption threshold based on the second parameter, the fourth target power consumption threshold being greater than the first original power consumption threshold; and/or determining to change a second threshold adjustment parameter from a third parameter to a fourth parameter based on the second operating power consumption information obtained at the current detection time point being less than the second operating power consumption information obtained at the second detection time point, and the second difference at the current detection time point being greater than the second difference at the second detection time point; and determining that a second power consumption threshold of the second processor is a third target power consumption threshold based on the fourth parameter, the third target power consumption threshold being less than the second original power consumption threshold, the third parameter corresponding to the second original power consumption threshold.

17. The non-transitory computer-readable storage medium of claim 16, wherein the control method further comprising:

obtaining a system power consumption threshold based on the first power consumption threshold and the second power consumption threshold; and when a number of times that the system power consumption threshold reaches the upper limit of a preset threshold range within a preset period of time reaches a preset number, adjusting the first power consumption threshold of the first processor from the first original power consumption threshold to the first target power consumption threshold and/or adjusting the second power consumption threshold of the second processor from the second original power consumption threshold to the second target power consumption threshold within the preset adjustment range based on any of the first difference and the second difference being less than the preset value.

18. The non-transitory computer-readable storage medium of claim 11, wherein the control method further comprising:

determining a system preset power consumption value based on the power consumption threshold of the processor;

determining a target temperature adjustment strategy based on the system preset power consumption value; and controlling a cooling module of an electronic device to operate with a target operating parameter based on the target temperature adjustment strategy.

19. The non-transitory computer-readable storage medium of claim 18, wherein after determining the system preset power consumption value based on the power consumption threshold of the processor, and before determining the target temperature adjustment strategy based on the system preset power consumption value, the method further comprising:

obtaining first adjustment information for at least two adjustable items of the processor, the first adjustment information being generated based on an input operation performed on an operating body, the at least two adjustable items being related to the power consumption threshold of the processor; and determining the system preset power consumption value of a target system based on the first adjustment information.

20. A control method comprising:

obtaining first operating power consumption information of a first processor and second operating power consumption information of a second processor at a current detection time point;

determining a first difference based on the first operating power consumption information and a first original power consumption threshold, and determining a second difference based on the second operating power consumption information and a second original power consumption threshold;

determining a first target power consumption threshold and/or a second target power consumption threshold within a preset adjustment range based on any one of the first difference and the second difference being less than a preset value, wherein:

the first target power consumption threshold is determined based on the first difference being less than the preset value and the second difference not being less than the preset value, the first target power consumption threshold being greater than the first original power consumption threshold;

the second target power consumption threshold is determined based on the second difference being less than the preset value and the first difference not being less than the preset value, the second target power consumption threshold being greater than the second original power consumption threshold; and the first target power consumption threshold and a third target power consumption threshold are determined based on both the first difference and the second difference being less than the preset value, the third target power consumption threshold being less than the second original power consumption threshold, a power consumption requirement priority of the first processor being higher than a power consumption requirement priority of the second processor; and adjusting a power consumption threshold of at least one of the first processor and the second processor from the corresponding original power consumption threshold to the corresponding target power consumption threshold to cause the processor to operate based on the target power consumption threshold before a first detection time point, wherein:

the original power consumption threshold is the power consumption threshold used by the processor from a second detection time point to the current detection time point, the first detection time point is later than and adjacent to the current detection time point, the second detection time point is earlier than and adjacent to the current detection time point, and the power consumption threshold is an upper limit of the power consumption for the processor during operation.

* * * * *